March 1, 1960

H. T. O'BRIEN 2,926,775

CABLE RETRIEVER FOR PIPE LINE CLEANING MACHINE

Filed March 19, 1954

Howard T. O'Brien
INVENTOR.

BY *Clarence A. O'Brien*
and *Harvey B. Jackson*
Attorneys

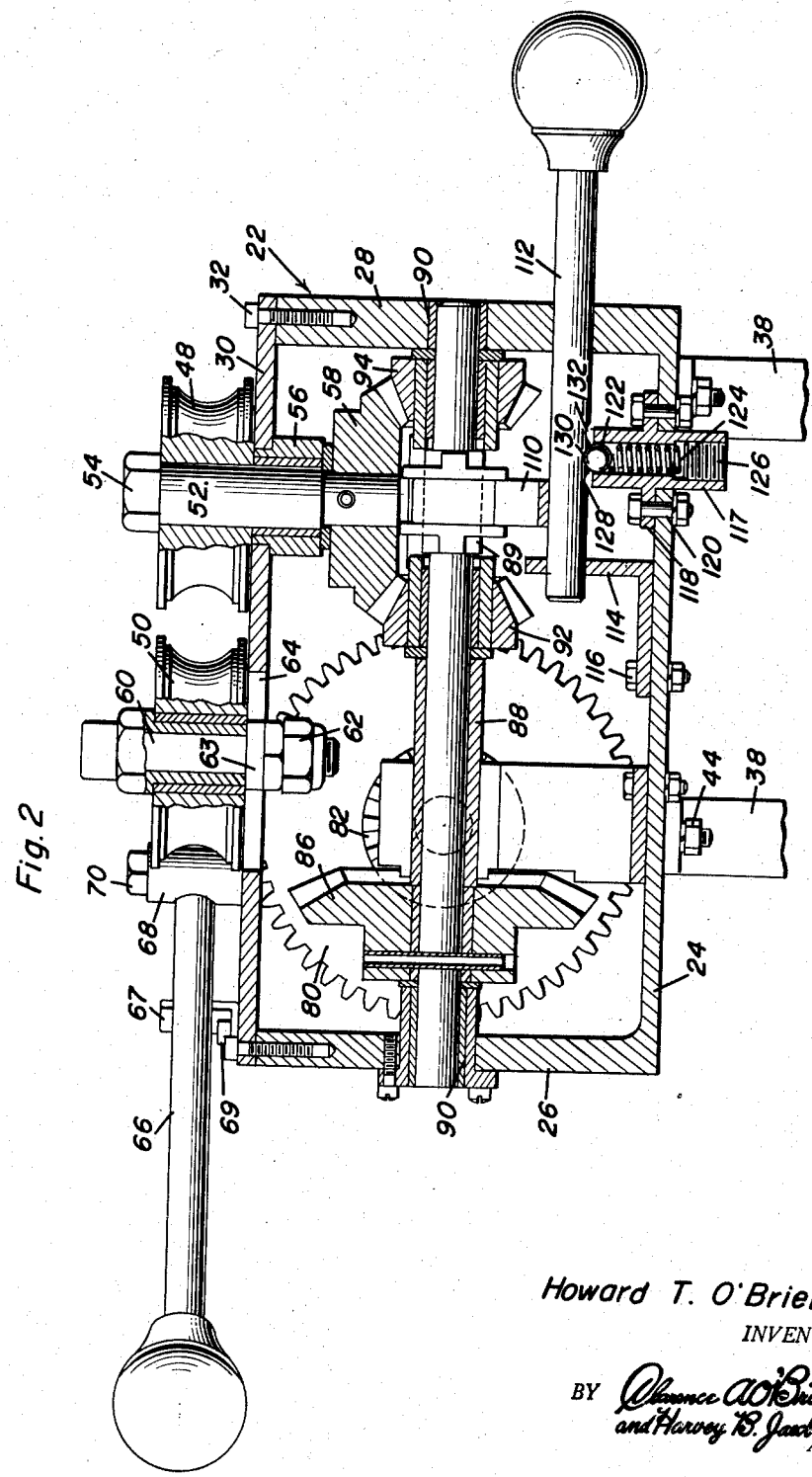

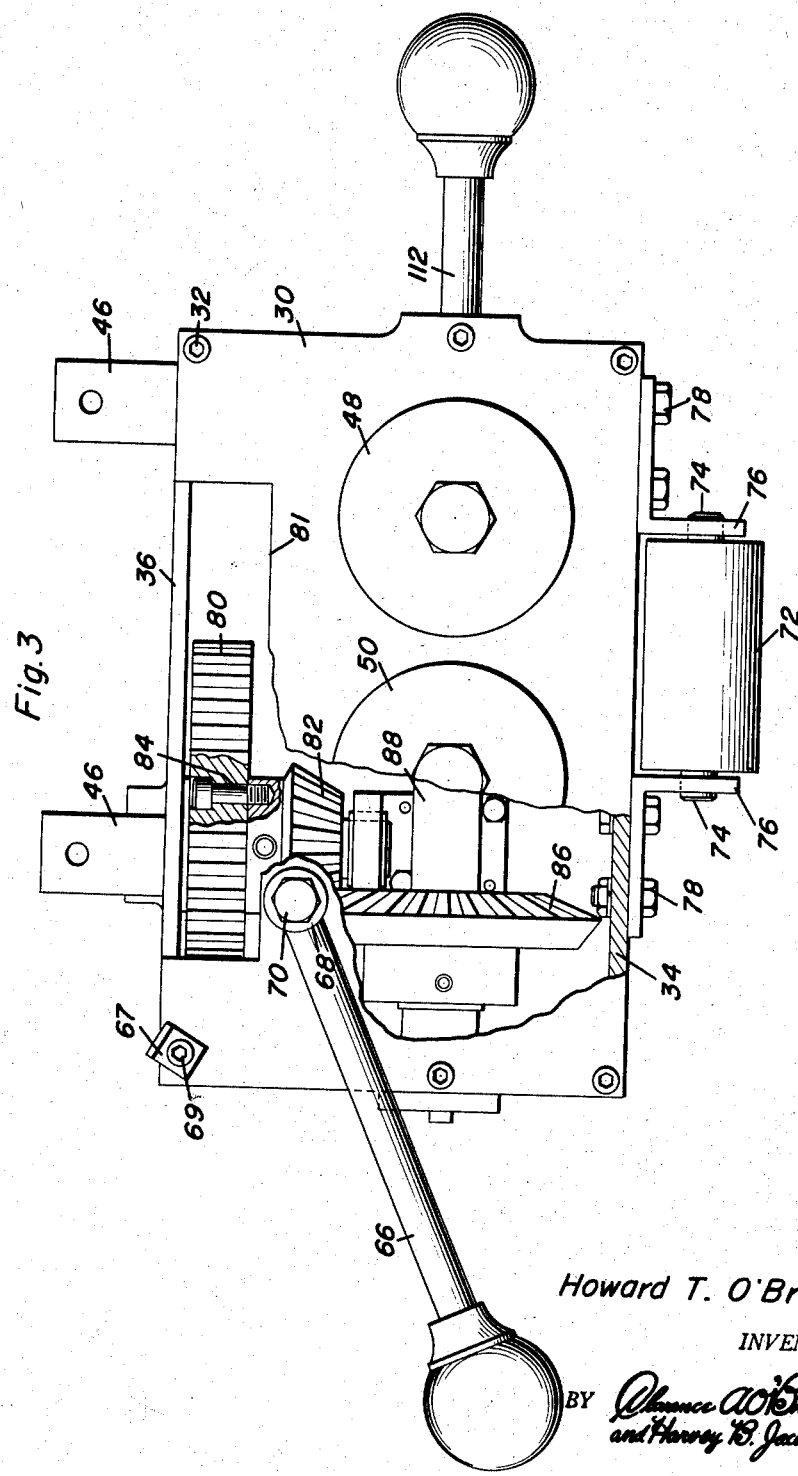

March 1, 1960
H. T. O'BRIEN
2,926,775
CABLE RETRIEVER FOR PIPE LINE CLEANING MACHINE
Filed March 19, 1954
5 Sheets-Sheet 4
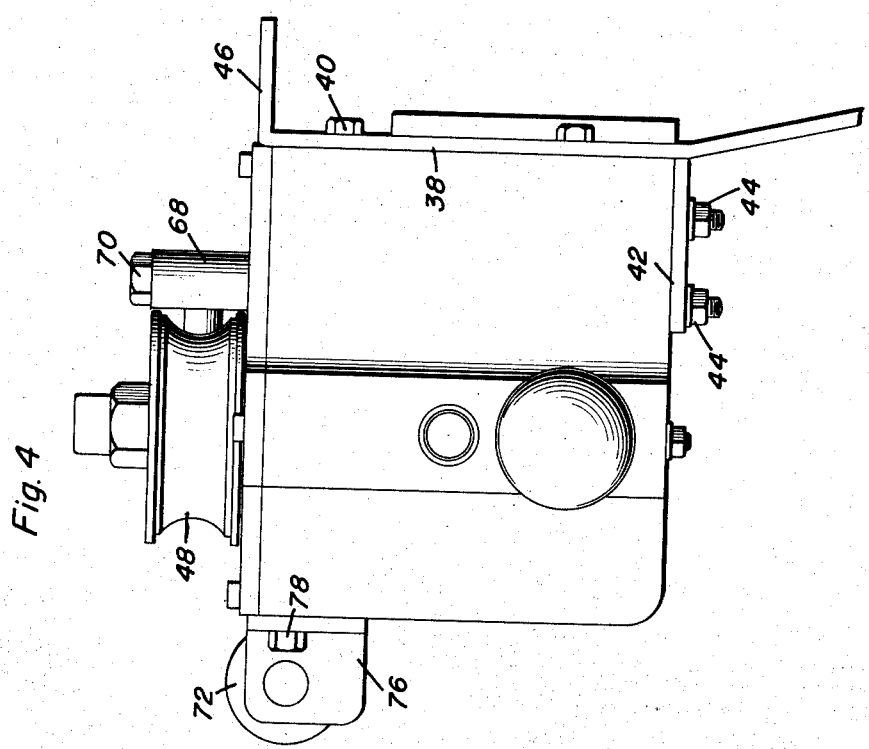
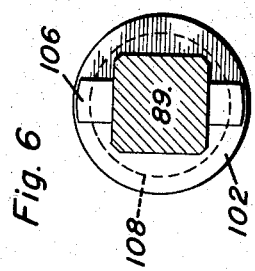
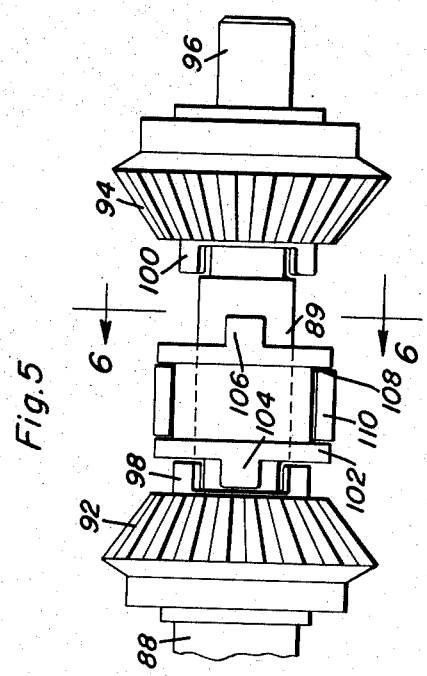
Howard T. O'Brien
INVENTOR.
BY *Clarence A. O'Brien*
and *Harvey B. Jacobson*
Attorneys March 1, 1960 H. T. O'BRIEN 2,926,775
CABLE RETRIEVER FOR PIPE LINE CLEANING MACHINE
Filed March 19, 1954 5 Sheets-Sheet 5
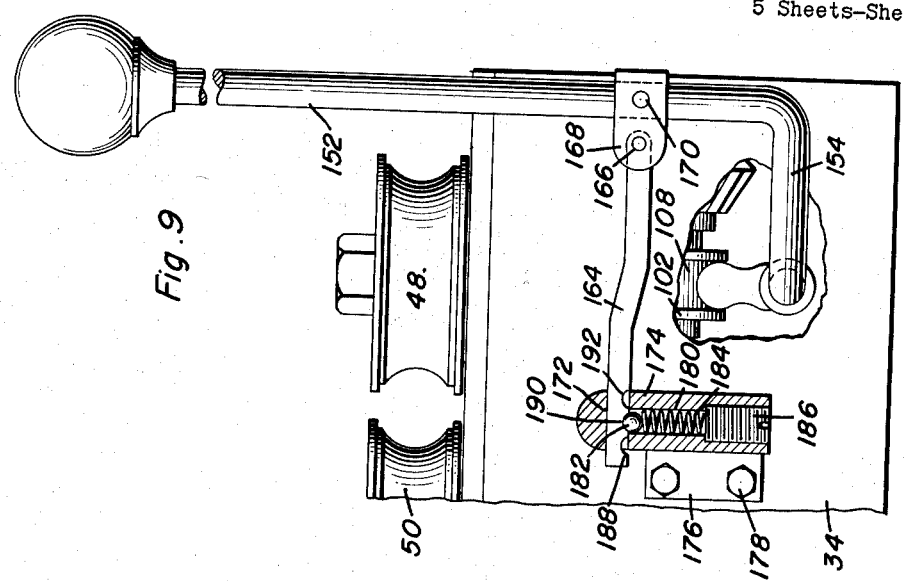
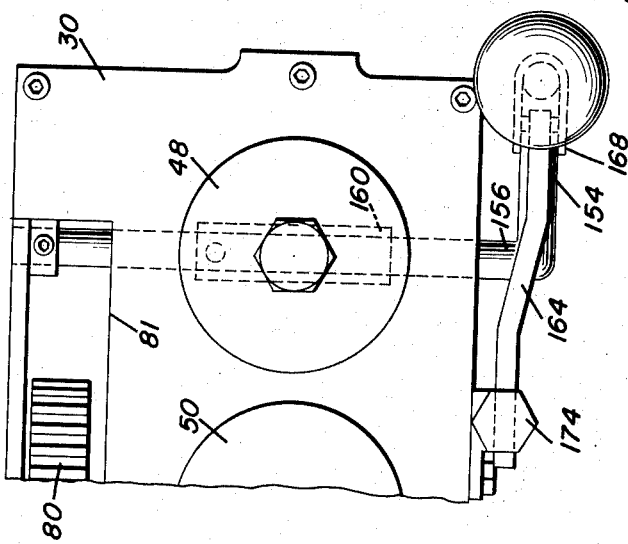
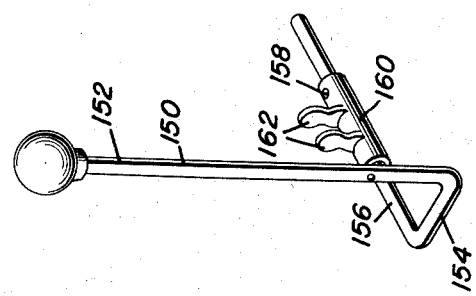
Howard T. O'Brien
INVENTOR.

United States Patent Office 2,926,775
Patented Mar. 1, 1960

2,926,775

CABLE RETRIEVER FOR PIPE LINE CLEANING MACHINE

Howard T. O'Brien, Chicago, Ill.

Application March 19, 1954, Serial No. 417,408

4 Claims. (Cl. 203—45)

This invention comprises novel and useful improvements in a cable retriever for pipe line cleaning machines and more specifically relates to a power operated device for imparting axial movement to flexible pipe line cleaning cables in either direction, while permitting rotary movement of said cables, and which may be readily applied as an attachment to conventional types of power operated pipe line cleaning machines.

A principal object of this invention is to provide a power operated feeding device for axially moving the flexible cables, commonly employed with conventional pipe line cleaning apparatuses and which may be readily applied to conventional apparatuses; and in such a device to make provision for more effective handling of the flexible cleaning cable by facilitating the application of power from a uni-directionally rotating source of power to effectively move the cable in either direction; and especially to provide a sensitive control of the application of power means for retrieving the flexible cable from a pipe line in which the same is operating and facilitate the storing of the cable in the rotary magazine of the cleaning apparatus.

An important object of the invention is to provide a power operated cable feeding device which may be readily applied to conventional forms of pipe line cleaning machines of the type employing flexible, rotatable cleaning cables.

Another important object of the invention resides in the provision of a cable retrieving apparatus in which a very positive, non-slipping engagement of the power operated retrieving apparatus with the flexible cable is effected and which may be applied or released with ease and certainty by the operator of the device.

And yet another important object of the invention is to provide a cable retrieving apparatus in conformity with the above-mentioned objects in which a positive axial feeding of the cable in either direction, may be attained with facility; and from a uni-directional source of power; whereby the reclaiming or withdrawing of the flexible cable from a pipe line being cleaned thereby may be effected under the complete control of the operator; and whereby cable may be readily fed from the magazine of a cleaning apparatus under complete control of the operator.

A still further important object of the invention is to provide an apparatus as set forth in the foregoing objects wherein a simple, improved and highly effective detent mechanism is provided whereby the control means of the apparatus for regulating the application of power to cable feeding pulleys may be yieldingly maintained in selected position in which the application of power is disconnected from the feeding pulleys, or is applied thereto to operate the same in reverse directions of travel of the cables.

Another important object of the invention is to provide a cable feeding and retrieving apparatus according to the above objects wherein a slidably mounted pulley may be manually moved towards a fixedly mounted pulley to provide a simple, highly effective and easily manipulated and releasable clamping action of the pulleys upon the flexible cable for the application of power means thereto for axially moving such cable.

And still another important object of the invention is to provide a power operated cable retriever, adapted for operative connection with conventional forms of pipe line cleaning apparatus of the flexible and rotatable cable-type, and which will afford the operator an extremely sensitive control of the application of power to the cable for retrieving the same either rapidly or with short intermittent axial movements of the cable, while permitting rotation of the cable.

The accompanying drawings illustrate two embodiments in which the principles of this invention may be applied to a cable retrieving apparatus constituting an attachment for conventional pipe line cleaning apparatuses. In the embodiment of Figures 1–6, there has been illustrated the form of the invention in which the principles thereof are applied in their simplest forms; while in Figures 7–9 there is disclosed a slightly modified construction in which an improved form of control means and detent means therefor has been illustrated.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 2 is an enlarged vertical longitudinal sectional view through the cable retriever of Figure 1, showing the position of the control and reverse mechanism when the source of power is disconnected from the cable feeding pulleys of the device;

Figure 3 is a top plan view of the device as shown in Figure 2, a part of the top wall being broken away to show the arrangement of certain of the interior elements of the same;

Figure 4 is an end elevational view of the retriever attachment, taken from the right end of Figures 2 and 3;

Figure 5 is a detail elevational view, upon an enlarged scale, of a portion of the clutch mechanism controlling the reverse mechanism of Figure 2;

Figure 6 is a vertical detail view taken substantially upon the plane indicated by the section line 6—6 of Figure 5;

Figure 7 is a perspective view of the control rod or lever of the modified control means of the invention;

Figure 1:
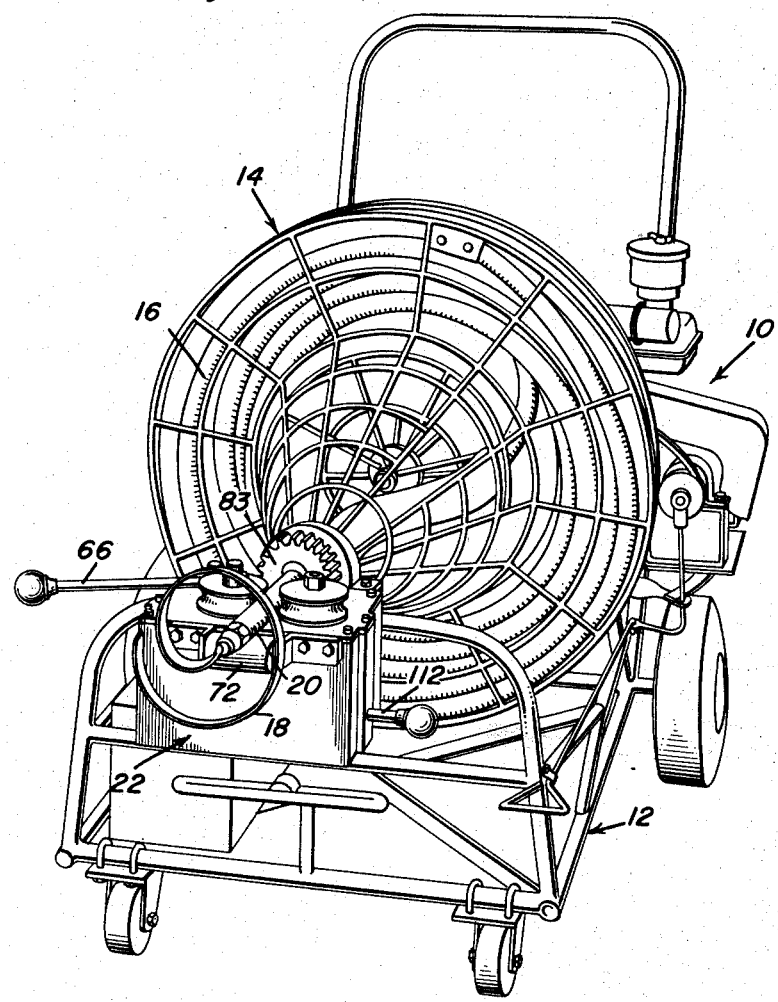
Figure 1 is a perspective view illustrating for the purposes merely of exemplifying the manner in which the principles of this invention may be practiced, a conventional form of pipe line cleaning apparatus of the flexible cable type, and to which the cable retriever device, forming the subject of this invention, is operatively connected as an attachment thereto.

Figure 8 is an enlarged fragmentary top plan view of the housing of the cable retriever, showing the modified control means and detent means applied thereto, certain hidden parts being indicated in dotted lines therein; and Figure 9 is an enlarged fragmentary elevational view of a portion of the housing of the retriever showing the modified control and detent means applied thereto, parts being broken away and shown in section to better disclose certain details of the same.

Reference is first made to the embodiment of Figures 1–6 for an exposition of one manner in which the principles of this invention may be satisfactorily applied, the control and detent means illustrated in Figure 2 being considered as a very simplified embodiment of the same, and being considered to be satisfactory for certain uses to which the invention may be put, although the somewhat more complex form of control and detent means shown in Figures 7–9 are in general considered to be preferable.

Referring first to Figure 1 it will be seen that the numeral 10 designates generally a conventional form of power operated pipe line cleaning apparatus, the same including a mobile wheeled supporting framework 12 upon which is mounted a rotatable magazine 14, driven by any suitable source of power, and which receives a flexible pipe line cleaning cable 16 of a conventional type. This cable is customarily formed of a steel wire wound in a plurality of convolutions to form a flexible tube. A pipe line cleaning blade or implement 18 of any desired type is customarily applied to the extremity 20 of the flexible cable whereby upon rotation of the magazine 14 and the cable 16, and upon feeding of the cable axially from the magazine, the cable and tool may be advanced into a pipe line for scraping and cleaning the same.

It is with an apparatus of this conventional type that the power operated cable retriever indicated generally by the numeral 22 and which forms the subject of this invention is adapted to be operatively applied as an attachment or adjunct, for providing a power operated means for feeding the cable axially from the magazine for various purposes, but preferably for providing a power means for withdrawing the cable from the pipe being cleaned and returning the cable into the rotating magazine.

As will be more apparent from Figure 2 the retrieving device 22 consists of a housing having a bottom wall 24, a pair of end walls 26 and 28, together with a removable top wall or cover plate 30 secured as by bolts 32. The housing also includes a pair of side walls, one of which is shown at 34 and the other at 36 in Figure 3.

Any suitable supporting means may be provided whereby the housing may be mounted upon the mobile frame 12 or supported in any other desired manner upon or in close juxtaposition to any conventional form of cleaning apparatus 10. Conveniently, as will be apparent from Figures 2–4, there are provided a pair of mounting brackets each indicated by the numeral 38 and which are detachably secured to the side wall 36 of the housing as by bolts 40. These brackets have horizontally extending arms 42 which underlie and support the bottom wall 24, as shown in Figure 4, as by means of the studs and nuts 44. At their upper ends the brackets 38 have horizontally extending arms 46 which extend in the opposite direction from the arms 42, and which constitute hanger brackets adapted to be secured to any desired portion of the frame 12. Thus, means are provided whereby the retriever device may be readily mounted upon any conventional form of pipe line cleaning apparatus in a detachable manner.

The retriever device is preferably so mounted upon or in juxtaposition to the pipe line cleaning apparatus that the top wall 30 will be disposed substantially in the horizontal plane of the extremity 20 of the cleaning cable when the latter emerges from the rotary mechanism 14. Surmounting and carried by the top wall is a pair of cable feeding pulleys 48 and 50 which constitute driving and pressure pulleys respectively.

The driving pulley 48 is fixedly secured to a vertical driving axle 52 as by means of a nut 54 for rotation with this axle, the pulley being disposed upon the top wall 30 while the axle extends through this wall, being journalled in a bearing bushing 56 carried upon the interior surface of the cover 30 within the interior of the housing. At its lower end, the axle 52 is provided with a bevel gear 58 constituting a driving gear for the driving pulley.

The pressure pulley 50 is rotatably journalled upon a vertical and shouldered idler axle 60, being retained thereon as by a nut 62 disposed upon the interior of the housing. The idler axle has a guide body portion 63 extending into a guide slot 64 formed in the top wall 30 whereby the pressure pulley may be moved towards and from the driving pulley, by a means to be set forth hereinafter, whereby these two pulleys embrace and may selectively release or clamp the cleaning cable 16 between the same.

It is to be understood that suitable ball or roller bearings may be utilized to journal the pressure pulley 50 upon the idler axle 60 if desired. Further, if deemed desirable, the driving pulley 48 and also if desired the pressure pulley 50 may be provided with friction ridges to establish a more positive gripping engagement upon the spiral convolutions of the flexible cable 16 in order to provide a positive gripping engagement of the same for feeding the cable in either direction upon rotation of the driving pulley 48, its driving axle 52 and driving gear 58 as set forth hereinafter.

It will now be understood that the pressure pulley 50 constitutes a convenient means whereby the driving engagement of the driving pulley with the flexible cable may be established or may be released; and whereby selective control may be very quickly accomplished. For this purpose there is provided an actuating lever 66 for urging the pressure pulley towards the driving pulley to thus establish this driving engagement of the cable. The lever 66 is preferably provided with a bushing or tubular hub 68 at one extremity, which is pivotally mounted upon the cover plate 30 as by a pivot bolt 70. It will be observed by reference to Figure 3 in particular that the axes of the pivot bolt 70 and of the axles 60 and 52 are all preferably perpendicular with respect to the cover plate 30 and in parallel arrangement with respect to each other. In addition, the pivot 70 is disposed to one side of and beyond a line extending from the axes of the axles 52 and 60. Thus, when the actuating lever 66 is given a horizontal swinging movement, an intermediate portion of the same will be brought into contact with the dished surface of the pressure pulley 50 and can be caused to press or urge the same by shifting the idler axle 60 in the guide slot 64, towards the driving pulley 48. The action of the lever 66 will thereby serve to cause the two pulleys to tightly clamp the cable therebetween whereby when a source of power is connected to the driving pulley axle 52 as set forth hereinafter, the cable may be positively fed either inwardly or outwardly of the magazine. The manipulable lever 66 provides a means which will facilitate the temporary and intermittent operation of the power means and thus enable the operator to obtain a precise control for feeding or retrieving the flexible cable by very slight movement of the lever 66 if desired.

A bracket 67 is mounted upon the cover 30 as by a bolt 69 to form a stop limiting the swinging movement of the lever 66 away from the pressure pulley 50.

Mounted upon the side wall 34 at the top of the same is a supporting roller 72 having pintles or trunnions 74 by which the roller is journalled in a pair of supporting brackets 76 which are detachably mounted upon the wall as by fastening bolts 78. This roller is so disposed, as will be apparent from a comparison of Figures 1 and 4, in order that the extremity 20 of the flexible cleaning cable 16 will be supported to facilitate passage of the cable through the feeding pulleys 48 and 50.

Power is applied to the driving axle 52 by a mechanism to be now described. A spur gear 80 is secured to a shaft which is suitably journalled within the housing and has secured to its hub a bevel gear 82 as by fastening bolts 84. An opening 81 in the cover 30 permits a driving gear such as the spur gear 83 mounted on the magazine 14 for rotation therewith to engage the spur gear 80, if desired. Rotation is applied to the gear 80 in any desired manner, conveniently, from any suitable source of power. Conveniently, a separate source of power may be provided for the gear 80 from that which serves to impart rotation to the magazine 14, although it is within the purview of this invention to utilize the same source of power if desired. Since, however, the source of power is in no way critical to the principles of this invention, a detailed description of the same is deemed to be unnecessary.

The gear 82 is continuously in mesh with a bevel gear 86 which is fixedly secured to a shaft 88 which is mounted in suitable journal bearings 90 in the housing end walls 26 and 28. Rotatable upon the shaft 88 is a bevel gear 92 which is complementary to and disposed axially with respect to a second bevel gear 94 similarly mounted upon that end of the shaft 88 which is adjacent to the wall 28. Suitable anti-friction bearing assemblies may be provided for the gears 92 and 94.

The two bevel gears 92 and 94 are continuously in mesh with the driving gear 58 previously mentioned. However, a reversing mechanism is provided whereby the gears 92 and 94 are alternatively connected in selection with the shaft 88 whereby reversed rotation of the driving pulley 48 may be effected relative to a uni-directional rotation of the gears 80 and 82.

For this purpose, as shown more clearly in Figure 5, the hubs of the gears 92 and 94 are provided with clutch jaws 98 and 100, respectively, facing each other and an axially sliding clutch member 102 is interposed between these gears which have the oppositely axially directed clutch jaws 98 and 100. The clutch member 102 is mounted upon the shaft 88 for axial sliding movement upon a diametrically enlarged squared shaft portion 89, as shown also in Figure 6. When the clutch member is slid toward the left as shown in Figure 5, the tongue 104 will cooperate with the jaw 98 while the tongue 106 will be disengaged from the clutch jaw 100 of the other bevel gear 94. Thus, in the position of Figure 5 the shaft 88 through the clutch member will positively drive the gear 92 and the latter in turn will actuate the driving gear 58 to rotate the driving pulley in one direction. When the clutch is shifted to the right hand end of Figure 5, the reverse condition will prevail and the oppositely disposed bevel gear 94 will in turn actuate the driving pulley 48 in a reverse direction.

In order to operate the clutch and shift the same the latter is provided with an annular circumferential control groove 108 and a fork 110 engages this groove whereby the clutch may be shifted.

The control means for this yoke consists of a clutch shift rod 112 which is slidably received and journalled in the end wall 28 and in a supporting bracket 114 secured within the housing upon the bottom wall 24 thereof as by a fastener bolt 116. The yoke 110 is welded or otherwise fixedly secured to rod 112 whereby upon sliding movement of the rod which is disposed in parallel relation to the axis of the shaft 88, the clutch will be actuated selectively to an intermediate neutral position in which neither of the gears are engaged or coupled to the shaft 88; to a left hand position shown in Figure 5 to connect the gear 92 with the shaft 88; or to a right hand position to connect the gear 94 with the shaft 88.

Detent means are provided for yieldingly retaining the control rod 112 in one of these three above-mentioned positions. This detent means expediently consists of a detent housing 116 in the form of a sleeve having mounting flanges 118, this sleeve extending through the bottom wall 24 of the housing and being secured as by bolts 120. The open inward end of the sleeve receives a detent ball 122 therein which is urged into engagement with the rod 112 as by a compression spring 124 whose compression is adjusted as by a threaded plug 126 disposed in the other end of the sleeve upon the exterior of the housing. The detent ball 122 is selectively engaged in one of three axially spaced recesses 128, 130 or 132 formed in the control rod 112. If desired, the rod 112 may be provided with any suitable form of guide means to prevent relative rotation of the rod and thus assure registration of the detent ball with the recesses, although the engagement of the fork 110 with the groove 108 will usually be sufficient for this purpose.

From the foregoing, it will be apparent that manipulation of the control rod 112 will selectively connect or disconnect the source of power from the driving axle 52; or will selectively connect the power to the axle for rotation in either of two reverse directions of rotation. By this arrangement, it is obvious that the device may be adjusted to either feed the cable from the magazine 14 when the same is desired for any particular purpose, or to retrieve the cable and feed the same into the magazine.

In general, however, it is regarded preferable, as the cable is being rotated by the usual mechanism provided for rotating the magazine, to feed the cable from the magazine by hand into the pipe to be cleaned since in this manner the presence of any obstruction which might cause damage to the cable or pipe can be readily detected by the operator. When it is desired to retrieve the cable from the pipe being cleaned, this can be readily effected by manipulation of the actuating lever 66, thus relieving the operator from the frequently extreme physical exertions required for withdrawing the cable, and yet giving the operator complete and precise control over the application of the power withdrawing means to the cable.

While the hereinbefore described embodiment has been found to be suitable for certain uses of this invention, the modified form of control and detent means shown in Figures 7–9 is deemed to be generally preferable. The general operation of the modified control and detent means is the same as that previously described but the specific structural and operational differences are as follows:

In place of the axially sliding control rod 112, there is provided a particular form of control rod 150, shown best in Figure 7. This includes a substantially vertical component 152 which at its lower end has a horizontally disposed component 154 the latter in turn having a further perpendicularly extending horizontal component 156, the latter extending into the housing and being suitably journalled in the two side walls 34 and 36 thereof. Intermediate its ends the portion 156 has fixedly secured thereto as by set screws 158, a sleeve 160 having a pair of upwardly extending arms 162 constituting a fork which is received within the previously mentioned fork receiving groove 108 of the member 102. It will thus be apparent that by oscillating the control rod 150 about the axis of its portion 156, that the fork arms 162 will shift the reversing clutch in the manner previously described. The modified detent mechanism for this modified control rod consists of a slide 164 which has one extremity pivoted as by a pin 166 to a bracket 168 secured to the vertical portion 152 of the control rod as by a pivot pin 170. The other end of the slide 164 is slidably received in a transverse passage 172 disposed in a member 174. The latter has a mounting flange 17 which is detachably secured through the agency of bolts 178 to any suitable portion of the housing wall 34. The member 174 is provided with a vertical bore 180 which intersects the transverse passage 172 and a detent ball 182 which together with a compression spring 184 is received within this bore, the compression of the spring being adjusted as by a screw threaded closure cap 186. The slide is provided with a plurality of axially spaced detent recesses 188, 190 and 192 which correspond to the recesses 128, 130 and 132 previously described. Functioning of this detent is the same as that previously described, the modified construction having the advantage that the detent mechanism is disposed upon the exterior of the casing where the same is accessible for servicing or repairs and whereby the same may be readily released from the control rod when desired.

The operation of this form of the invention, except as to the specific actuation of the control and detent mechanism, is identical with that previously described.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A cable retriever adapted for use in connection with a pipe line cleaning machine and comprising a housing adapted for mounting in operative association upon the frame of the machine, a single vertically disposed driving axle journalled in said housing, a cable-engaging driving pulley fixed to said axle exteriorly of the housing, a single vertically disposed idler axle journalled in said housing in a vertical axial plane common to that of the vertical driving axle, said housing including means for guidingly and slidingly mounting said idler axle for movement towards and away from said driving axle in the common plane thereof, a cable-engaging pressure pulley mounted on said idler axle exteriorly of the housing and adapted when the idler axle is shifted towards the idler axle to clamp a pipe cleaning cable between it and the driving pulley for axial drive of the cable by said driving pulley and when said idler axle is shifted away from said driving axle to release the cable so that the latter is not subject to axial drive by said driving pulley, manually operable pressure means mounted on, and disposed exteriorly of, the housing and operatively associated with said pressure pulley for urging the pressure pulley along said common plane into its clamping position with respect to the driving pulley, a horizontal unidirectional power-driven drive shaft rotatably mounted within the housing, a disengageable clutch assembly and bevel gearing disposed within said housing and operatively interposed between said drive shaft and said driving axle for selectively connecting the drive shaft to the driving axle for rotation of the latter in opposite directions respectively, said clutch assembly including a shiftable element movable between one extreme position wherein it establishes a driving connection between the drive shaft and a certain part of the gearing for effecting rotation of the driving axle in one direction and another extreme position wherein it establishes a driving connection between the drive shaft and another part of said gearing for effecting rotation of the driving axle in the opposite direction, detent means operative yieldingly to maintain said shiftable element of the clutch assembly in either of its extreme positions and including a handle-equipped actuating element mounted on, and disposed exteriorly of, the housing, and a cable guide roller rotatably journalled on the housing and projecting thereabove for guiding the cable into operative register with said driving and pressure pulleys.

2. A power operated cable retriever adapted for use with a pipe line cleaning machine of the type having a power rotated pipe line cleaning cable, said retriever comprising: a housing, cable engaging driving and pressure pulleys carried by and projecting above said housing, each pulley being provided with a cable-engaging groove therein, parallel axles for said pulleys, driving means in said housing including a unidirectional source of power for imparting rotation to said driving pulley, said driving means including reverse mechanism for controlling the direction of rotation imparted to the driving pulley and for selectively disconnecting the driving means therefrom, control means for operating said reverse mechanism, means for supporting said housing upon the frame of a pipe line cleaning machine in position for disposing said pulleys in horizontal alignment with the cable extruded from said machine, means journaling the axle of the driving pulley for rotation about a stationary axis, means mounting the axle of the pressure pulley for movement towards and from the driven pulley, and means for urging the pressure pulley towards the driven pulley for frictionally clamping the pipe cleaning cable therebetween whereby to move said cable axially, said mounting means including a guide opening in the top wall of said housing, said pressure pulley axle having a guide member slidable in said opening, said urging means comprising a member movably mounted on said housing for horizontal movement and engageable in the groove of the pressure pulley, said member comprising a lever, a pivot for said lever secured to the top wall of said housing.

3. A power operated cable retriever adapted for use with a pipe line cleaning machine of the type having a power rotated pipe line cleaning cable, said retriever comprising: a housing, cable engaging driving and pressure pulleys carried by and projecting above said housing, parallel axles for said pulleys, driving means in said housing including a unidirectional source of power for imparting rotation to said driving pulley, said driving means including reverse mechanism for controlling the direction of rotation imparted to the driving pulley and for selectively disconnecting the driving means therefrom, control means for operating said reverse mechanism, means for supporting said housing upon the frame of a pipe line cleaning machine in position for disposing said pulleys in horizontal alignment with the cable extruded from said machine, said control means including a clutch mechanism operatively connected to said reverse mechanism and constituting a part thereof, a transverse shaft journaled in said housing and connected to said clutch mechanism, and detent means carried by said housing and cooperating with said shaft for yieldingly retaining the shaft and clutch mechanism in selected adjusted position, said shaft extending through a side of said housing and having a lever arm thereon, said detent means being mounted upon the exterior of said housing and having a connection with said lever arm.

4. A power operated cable retriever adapted for use with a pipe line cleaning machine of the type having a power rotated pipe line cleaning cable, said retriever comprising: a housing, cable engaging driving and pressure pulleys carried by and projecting above said housing, parallel axles for said pulleys, driving means in said housing including a unidirectional source of power for imparting rotation to said driving pulley, said driving means including reverse mechanism for controlling the direction of rotation imparted to the driving pulley and for selectively disconnecting the driving means therefrom, control means for operating said reverse mechanism, means for supporting said housing upon the frame of a pipe line cleaning machine in position for disposing said pulleys in horizontal alignment with the cable extruded from said machine, said control means including a clutch mechanism operatively connected to said reverse mechanism and constituting a part thereof, a transverse shaft journaled in said housing and connected to said clutch mechanism, and detent means carried by said housing and cooperating with said shaft for yieldingly retaining the shaft and clutch mechanism in selected adjusted position, said shaft extending through a side of said housing and having a lever arm thereon, said detent means being mounted upon the exterior of said housing and having a connection with said lever arm, said detent means including a body having a slot therein, a slide movable through said slot and having spaced detent recesses therein, a resiliently urged detent member in said body selectively engageable with said detent recesses, and means pivotally connecting said slide to said lever arm.

References Cited in the file of this patent

UNITED STATES PATENTS

| | | |
|---|---|---|
| Re. 13,971 | Penderquist | Aug. 24, 1915 |
| 1,315,970 | King | Sept. 16, 1919 |
| 1,648,048 | Hochtritt | Nov. 8, 1927 |
| 2,192,439 | Gustafson | Mar. 5, 1940 |
| 2,351,111 | Davis | June 13, 1944 |
| 2,603,343 | Payne | July 15, 1952 |
| 2,613,706 | Smith | Oct. 14, 1952 |
| 2,655,066 | Siegerist | Oct. 13, 1953 |
| 2,670,926 | Sewell | Mar. 2, 1954 |